United States Patent
Luo et al.

(10) Patent No.: US 12,454,583 B1
(45) Date of Patent: Oct. 28, 2025

(54) QUATERNIZED CELLULOSE-BASED RESIN AND PREPARATION METHOD AND APPLICATION THEREOF

(71) Applicant: Shanghai Jiao Tong University, Shanghai (CN)

(72) Inventors: Jinming Luo, Shanghai (CN); Jinjing Huang, Shanghai (CN); Kaixing Fu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 19/067,838

(22) Filed: Mar. 1, 2025

(30) Foreign Application Priority Data

Apr. 30, 2024 (CN) .......................... 202410545679.6

(51) Int. Cl.
| | |
|---|---|
| C08B 15/06 | (2006.01) |
| C02F 1/28 | (2023.01) |
| C02F 101/14 | (2006.01) |
| C08G 81/02 | (2006.01) |

(52) U.S. Cl.
CPC .............. *C08B 15/06* (2013.01); *C02F 1/285* (2013.01); *C08G 81/02* (2013.01); *C02F 2101/14* (2013.01)

(58) Field of Classification Search
CPC ................................ C08B 15/06; C08G 81/02
See application file for complete search history.

(56) References Cited

U.S. PATENT DOCUMENTS 5,731,259 A  3/1998 Palumbo et al.

FOREIGN PATENT DOCUMENTS

| | | |
|---|---|---|
| AU | 2020101505 A4 | 8/2020 |
| CN | 1287562 A | 3/2001 |
| CN | 107522877 A | 12/2017 |
| CN | 114752002 A | 7/2022 |

OTHER PUBLICATIONS

Entry for "application", OED [online], https://www.oed.com/, [retreived on Apr. 28, 2025] (Year: 2025).*
Li et al., BioResources, 2014, 10(4), p. 7782-7794. (Year: 2014).*
Wartelle et al., Journal of Environmental Management, 2006, 78 p. 157-162. (Year: 2006).*

* cited by examiner

*Primary Examiner* — Jonathan S Lau

(57) ABSTRACT

Disclosed are a quaternized cellulose-based resin and a preparation method and application thereof. Cellulose extracted from traditional Chinese medicine waste residues is subjected to functional modification, and then grafted to a surface of chloromethylated polystyrene, so as to obtain the quaternized cellulose-based resin. The preparation method does not involve toxic reagents, is green and environment-friendly, is low in cost, and effectively prevents and controls PFAS pollution while realizing harmless treatment and resource utilization of solid wastes, thus ensuring the safety of drinking water. The quaternized cellulose-based resin comprises the chloromethylated polystyrene and the quaternized cellulose modified on the surface of the chloromethylated polystyrene. The quaternized cellulose-based resin is easy to recover, is used on a large scale, solves the problem that a powder adsorbent is difficult to recover and use on a large scale, has good stability, and effectively removes trace perfluorinated substances in drinking water.

3 Claims, 4 Drawing Sheets

QUATERNIZED CELLULOSE-BASED RESIN AND PREPARATION METHOD AND APPLICATION THEREOF

CROSS REFERENCE TO RELATED APPLICATIONS

This application claims foreign priority of Chinese Patent Application No. 202410545679.6, filed on Apr. 30, 2024 in the China National Intellectual Property Administration, the disclosures of all of which are hereby incorporated by reference.

TECHNICAL FIELD

The present invention belongs to the technical field of new material preparation, and particularly relates to a quaternized cellulose-based resin and a preparation method and application thereof.

BACKGROUND OF THE PRESENT INVENTION

Perfluoroalkyl and polyfluoroalkyl substances (PFAS) have been widely used in manufacturing industry and consumer goods for decades, but now the substances have attracted global attention as primary pollutants, and more than 1400 chemicals are listed in the "Toxic Substances Control Act List". With the increasing concern about the ecological persistence, accumulation and health hazards of the PFASs, the most widely used long-chain PFASs (chain length >7) perfluorooctane sulfonate and perfluorooctanoate have been restricted in production and use by the "Stockholm Convention".

The development of effective restoration methods to remove these compounds has attracted the attention of the public and the scientific community. In many proven restoration methods, adsorption is the simplest and most cost-effective method to remove the PFAS. At present, aminated resin materials are widely used for the adsorption of the PFAS in water. These resin materials can adsorb the PFAS by an electrostatic action, and are easy to be recovered from water, which is convenient for large-scale application. However, traditional aminated resin materials usually need organic amine reagents and chloromethylated polystyrene to react, and the whole reaction process needs to be carried out in an organic system, such as benzene, dichloroethane, carbon tetrachloride, acetone, and others.

SUMMARY OF THE PRESENT INVENTION

The present invention aims to provide a quaternized cellulose-based resin and a preparation method and application thereof, and the preparation method provided by the present invention is green and environment-friendly, and does not involve toxic reagents.

In order to achieve the objective above, the present invention provides the following technical solutions.

The present invention provides a preparation method of a quaternized cellulose-based resin, which comprises the following steps of:

(1) mixing a cellulose solution, sodium hydroxide, urea and water, and then sequentially subjecting the mixture to pre-cooling and high-speed mixing to obtain a cellulose solution, wherein a rotating speed of the high-speed mixing is 500 rpm to 1000 rpm;

(2) mixing a 3-chloro-2-hydroxypropyl trimethyl ammonium chloride aqueous solution with the cellulose solution for a quaternization reaction to obtain a quaternized cellulose solution; and (3) mixing the quaternized cellulose solution with chloromethylated polystyrene for a high-temperature reaction, wherein a particle size of the chloromethylated polystyrene is 0.315 mm to 1.250 mm, and a temperature of the high-temperature reaction is 100° C. to 150° C., so as to obtain the quaternized cellulose-based resin.

Preferably, the cellulose solution comprises the cellulose and the water; a mass ratio of the cellulose to the urea in the cellulose solution is 1:25 to 100; a mass ratio of the cellulose to the sodium hydroxide in the cellulose solution is 1:25 to 100; and a mass ratio of the urea to the water is 1:2 to 11.

Preferably, a temperature of the pre-cooling is −10° C. to −50° C., and thermal insulation lasts for 1 hour to 5 hours.

Preferably, a molar ratio of 3-chloro-2 hydroxypropyl trimethyl ammonium chloride in the 3-chloro-2-hydroxypropyl trimethyl ammonium chloride aqueous solution to a cellulose unit in the cellulose solution is 5 to 50:1.

Preferably, a temperature of the quaternization reaction is 20° C. to 50° C., and thermal insulation lasts for 12 hours to 20 hours.

Preferably, a mass ratio of the chloromethylated polystyrene to the quaternized cellulose is 1 to 10:1.

Preferably, thermal insulation of the high-temperature reaction lasts for 10 hours to 15 hours.

The present invention further provides a quaternized cellulose-based resin obtained by the preparation method in the solution above, which comprises the chloromethylated polystyrene and the quaternized cellulose modified on the surface of the chloromethylated polystyrene.

Preferably, the mass ratio of the chloromethylated polystyrene to the quaternized cellulose is 1 to 10:1.

The present invention further provides an application of the quaternized cellulose-based resin in the solution above in water purification.

The present invention provides the preparation method of the quaternized cellulose-based resin. According to the present invention, cellulose extracted from traditional Chinese medicine waste residues is subjected to functional modification, and then grafted to the surface of the chloromethylated polystyrene, the quaternized cellulose-based resin obtained is easy to recover, can be used on a large scale, solves the problem that a powder adsorbent is difficult to recover, has good stability, and has excellent ability to remove perfluorinated substances in drinking water. Compared with traditional aminated resin synthesis, the preparation method provided by the invention does not involve toxic reagents, is green and environment-friendly during synthesis, is low in cost, and effectively prevents and controls PEAS pollution while realizing harmless treatment and resource utilization of solid wastes, thus ensuring the safety of drinking water.

According to the present invention, the cellulose is used as a raw material, and the cellulose is one of the richest biopolymers on the earth, has low toxicity and biocompatibility, and is rich in hydroxyl groups on surface, low in cost, and green and environment-friendly.

The present invention further provides a quaternized cellulose-based resin obtained by the preparation method in the solution above, which comprises the chloromethylated polystyrene and the quaternized cellulose modified on the surface of the chloromethylated polystyrene. The quaternized cellulose-based resin provided by the present invention is easy to separate from water and easy to recover, solves the problem that the powder adsorbent is difficult to recover, has good stability, can be produced on a large scale, has excellent removal ability for the perfluorinated substances in drinking water, and can effectively remove trace perfluorinated substances in drinking water and effectively prevents and controls PEAS pollution, thus ensuring the safety of drinking water.

The present invention further provides the application of the quaternized cellulose-based resin in the solution above in water purification. The quaternized cellulose-based resin provided by the present invention can effectively remove the perfluorinated substances (PFAS) in water, especially drinking water, such as perfluorooctanoic acid (PFOA) and perfluorooctane sulfonic acid (PFOS), and reach the latest Drinking Water Standards (GB5749-2022) in China.

DESCRIPTION OF THE DRAWINGS

In order to illustrate technical solutions in embodiments of the present invention or in the prior art more clearly, the drawings used in the embodiments will be briefly described below. Obviously, the drawings in the following description are merely some embodiments of the present invention. For those of ordinary skills in the art, other drawings may also be obtained based on these drawings without going through any creative work.

DETAILED DESCRIPTION OF PREFERRED EMBODIMENTS

Figure 1A:
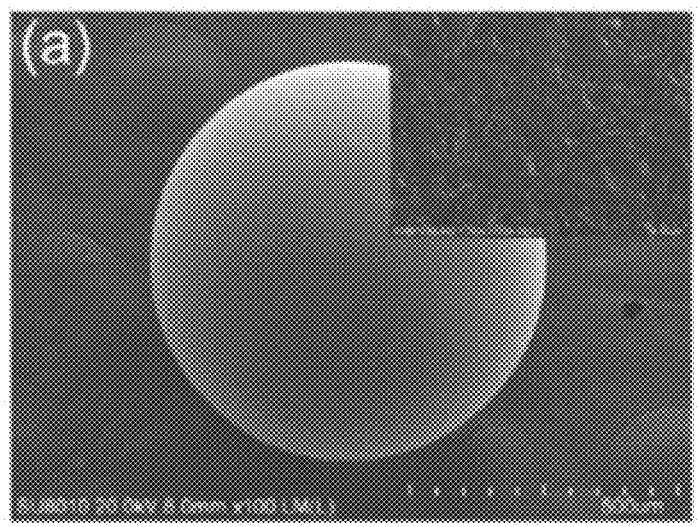
FIG. 1(a) and FIG. 1(b) are scanning electron microscope images of original chloromethylated polystyrene (a) and a quaternized cellulose-based resin (b) in Embodiment 1 of the present invention.

The present invention provides a preparation method of a quaternized cellulose-based resin, which comprises the following steps:

(1) mixing a cellulose solution, sodium hydroxide, urea and water, and then sequentially subjecting the mixture to pre-cooling and high-speed mixing to obtain a cellulose solution, wherein a rotating speed of the high-speed mixing is 500 rpm to 1000 rpm;

(2) mixing a 3-chloro-2-hydroxypropyl trimethyl ammonium chloride aqueous solution with the cellulose solution for a quaternization reaction to obtain a quaternized cellulose solution; and (3) mixing the quaternized cellulose solution with chloromethylated polystyrene for a high-temperature reaction, wherein a particle size of the chloromethylated polystyrene is 0.315 mm to 1.250 mm, and a temperature of the high-temperature reaction is 100° C. to 150° C., so as to obtain the quaternized cellulose-based resin.

According to the present invention, the cellulose solution, the sodium hydroxide, the urea and the water are mixed, and then the mixture is sequentially subjected to pre-cooling and high-speed mixing to obtain the cellulose solution. In the present invention, the preparation method of the cellulose solution is preferably as follows: traditional Chinese medicine waste residue cellulose is obtained with reference to Chinese patent CN 117144707 A, and the traditional Chinese medicine waste residue cellulose obtained is mixed with water (which is recorded as first mixing). According to the present invention, lignin and hemicellulose are removed by a one-step peroxymonosulfate (PMS) heating method to obtain the traditional Chinese medicine waste residue cellulose.

In the present invention, raw materials of the traditional Chinese medicine waste residue cellulose are traditional Chinese medicine waste residues; and the traditional Chinese medicine waste residues preferably comprise one or more of Paeoniae Radix Rubra, Radix Achyranthis Bidentatae and Weisu.

In the present invention, the first mixing is preferably ultrasonic mixing; and power of the ultrasonic mixing is preferably 1000 W to 1200 W, and the ultrasonic mixing preferably lasts for 10 minutes to 30 minutes. According to the present invention, a uniformly dispersed cellulose solution is obtained through short-time high-power ultrasonic treatment.

In the present invention, the water is preferably distilled water.

In the present invention, a mass ratio of the cellulose to the urea in the cellulose solution is preferably 1:25 to 100, more preferably 1:40 to 90, and further preferably 1:50 to 80.

In the present invention, a mass ratio of the cellulose to the sodium hydroxide in the cellulose solution is preferably 1:25 to 100, more preferably 1:30 to 90, and further preferably 1:35 to 70.

In the present invention, a mass ratio of the urea to the water is preferably 1:2 to 11, more preferably 1:3 to 10, and further preferably 1:4 to 8.

In the present invention, a temperature of the pre-cooling is preferably −10° C. to −50° C., more preferably −15° C. to −30° C., and further preferably −20° C., and thermal insulation preferably lasts for 1 hour to 5 hours, more preferably lasts for 2 hours to 4 hours, and further preferably lasts for 3 hours; and a device for the pre-cooling is preferably a refrigerator.

In the present invention, high-speed mixing is preferably carried out quickly after the pre-cooling; the high-speed mixing is preferably high-speed stirring; a temperature of the high-speed stirring is preferably 25° C. to 45° C., more preferably 30° C. to 40° C., and further preferably 35° C., and the stirring preferably lasts for 5 minutes to 30 minutes, more preferably lasts for 10 minutes to 20 minutes, and further preferably lasts for 15 minutes.

After the cellulose solution is obtained, according to the present invention, the 3-chloro-2-hydroxypropyl trimethyl ammonium chloride aqueous solution is mixed with the cellulose solution (which is recorded as second mixing) for the quaternization reaction to obtain the quaternized cellulose solution. In the present invention, a molar ratio of 3-chloro-2 hydroxypropyl trimethyl ammonium chloride in the 3-chloro-2-hydroxypropyl trimethyl ammonium chloride aqueous solution to a cellulose unit in the cellulose solution is preferably 5 to 50:1, more preferably 10 to 45:1, and further preferably 20 to 40:1.

In the present invention, the second mixing is preferably as follows: the cellulose solution is stirred (which is recorded as second stirring), and meanwhile, the 3-chloro-2-hydroxypropyl trimethyl ammonium chloride aqueous solution is dropwise added into the cellulose solution and then stirred continuously (which is recorded as second stirring).

In the present invention, a rate of the dropwise adding is preferably 30 drops/minute to 90 drops/minute, and more preferably 40 drops/minute to 80 drops/minute; and a rate of the second stirring is preferably 300 rpm to 800 rpm, and more preferably 400 rpm to 600 rpm.

In the present invention, a temperature of the quaternization reaction is preferably 25° C. to 50° C., and more preferably 35° C. to 40° C., and thermal insulation preferably lasts for 12 hours to 20 hours, and more preferably lasts for 16 hours.

After the quaternized cellulose solution is obtained, according to the present invention, the quaternized cellulose solution is mixed with the chloromethylated polystyrene for the high-temperature reaction, wherein the particle size of the chloromethylated polystyrene is 0.315 mm to 1.250 mm, and the temperature of the high-temperature reaction is 100° C. to 150° C., so as to obtain the quaternized cellulose-based resin. In the present invention, a mass ratio of the chloromethylated polystyrene to the quaternized cellulose is preferably 1 to 10:1, more preferably 2 to 8:1, and further preferably 3 to 6:1.

In the present invention, the particle size of the chloromethylated polystyrene is preferably 0.35 mm to 1.25 mm, more preferably 0.45 mm to 1.25 mm, and further preferably 0.63 mm to 1.25 mm.

In the present invention, the temperature of the high-temperature reaction is preferably 105° C. to 145° C., more preferably 110° C. to 140° C., and further preferably 115° C. to 130° C., and the thermal insulation preferably lasts for 10 hours to 15 hours, more preferably lasts for 11 hours to 14 hours, and further preferably lasts for 12 hours to 13 hours.

In the present invention, after the high-temperature reaction, the preparation method preferably further comprises post-treatment of the obtained product; and the post-treatment is preferably as follows: the obtained product is sequentially subjected to soaking, water washing and drying.

In the present invention, the soaking preferably lasts for 3 hours to 8 hours, and more preferably lasts for 5 hours; and a reagent used in the soaking is preferably deionized water.

In the present invention, water used in the water washing is preferably deionized water for washing the product to be neutral.

In the present invention, the drying is preferably baking; and a temperature of the baking is preferably 60° C. to 80° C., and more preferably 65° C. to 75° C., and thermal insulation preferably lasts for 10 hours to 15 hours, and more preferably lasts for 12 hours to 13 hours.

The present invention further provides a quaternized cellulose-based resin obtained by the preparation method in the solution above, which comprises the chloromethylated polystyrene and the quaternized cellulose modified on the surface of the chloromethylated polystyrene.

In the present invention, the mass ratio of the chloromethylated polystyrene to the quaternized cellulose is preferably 1 to 10:1, more preferably 2 to 8:1, and further preferably 3 to 6:1.

The quaternized cellulose-based resin provided by the present invention is easy to recover, can be used on a large scale, solves the problem that a powder adsorbent is difficult to recover, has good stability, and has excellent ability to remove perfluorinated substances in water.

The present invention further provides an application of the quaternized cellulose-based resin in the solution above in water purification. The quaternized cellulose-based resin provided by the present invention has a good adsorptive property and an excellent removal effect on the perfluorinated substances in water, especially drinking water, and can reach the latest Drinking Water Standards (GB5749-2022) in China.

In order to further illustrate the present invention, the solutions of the present invention are described in detail hereinafter with reference to the drawings and the embodiments, but they cannot be understood as limiting the scope of protection of the present invention.

Embodiment 1

(1) Preparation of cellulose solution: Cellulose precursor solution were obtained with reference to Chinese patent CN 117144707 A (method for selectively extracting cellulose from traditional Chinese medicine residues through PMS oxidation), and then were subjected to ultrasonic mixing with water at power of 1080 W for 20 minutes to obtain the cellulose solution; and a raw material of cellulose from the traditional Chinese medicine waste residues was Paeoniae Radix Rubra.

(2) The cellulose solution was added with sodium hydroxide, urea and distilled water, and stirred to dissolve, and the obtained aqueous solution was pre-cooled in a refrigerator to −20° C. and stored for 3 hours, and then immediately stirred vigorously at 25° C. at 600 rpm for 15 minutes to obtain a cellulose solution.

A mass ratio of cellulose to the urea in the cellulose solution was 1:55; a mass ratio of the cellulose to the sodium hydroxide in the cellulose solution was 1:37; and a mass ratio of the urea to the distilled water was 1:7.

(3) 3-chloro-2-hydroxypropyl trimethyl ammonium chloride and a cellulose unit in the cellulose solution, in a molar ratio of 40:1, were dropwise added into the cellulose solution at a rate of 60 drops/minute, the mixture was stirred and mixed at 25° C. for 16 hours, the obtained quaternized cellulose solution was added into a reaction kettle, and then added with chloromethylated polystyrene with a particle size of 0.63 mm to 1.25 mm to react at 120° C. for 12 hours, and the obtained product was repeatedly washed with deionized water to be neutral, then soaked with deionized water for 5 hours, and dried to obtain a quaternized cellulose-based resin.

A mass ratio of the chloromethylated polystyrene to the quaternized cellulose was 5:1.

Embodiment 2

(1) Preparation of cellulose solution: the same as that in Embodiment 1.

(2) The cellulose solution was added with sodium hydroxide, urea and distilled water, and stirred to dissolve, and the obtained aqueous solution was pre-cooled in a refrigerator to −15° C. and stored for 5 hours, and then immediately stirred vigorously at 30° C. at 800 rpm for 10 minutes to obtain a cellulose solution.

A mass ratio of cellulose to the urea in the cellulose solution was 1:55; a mass ratio of the cellulose to the sodium hydroxide in the cellulose solution was 1:37; and a mass ratio of the urea to the distilled water was 1:7.

(3) 3-chloro-2-hydroxypropyl trimethyl ammonium chloride and a cellulose unit in the cellulose solution, in a molar ratio of 40:1, were dropwise added into the cellulose solution at a rate of 60 drops/minute, the mixture was stirred and mixed at 35° C. for 12 hours, the obtained quaternized cellulose solution was added into a reaction kettle, and then added with chloromethylated polystyrene with a particle size of 0.63 mm to 1.25 mm to react at 120° C. for 12 hours, and the obtained product was soaked with deionized water for 4 hours, repeatedly washed with deionized water to be neutral, and then dried to obtain a quaternized cellulose-based resin.

A mass ratio of the chloromethylated polystyrene to the quaternized cellulose was 5:1.

Embodiment 3

(1) Preparation of cellulose solution: the same as that in Embodiment 1.

(2) The cellulose solution was added with sodium hydroxide, urea and distilled water, and stirred to dissolve, and the obtained aqueous solution was pre-cooled in a refrigerator to −25° C. and stored for 2 hours, and then immediately stirred vigorously at 35° C. at 1000 rpm for 5 minutes to obtain a cellulose solution.

A mass ratio of cellulose to the urea in the cellulose solution was 1:55; a mass ratio of the cellulose to the sodium hydroxide in the cellulose solution was 1:37; and a mass ratio of the urea to the distilled water was 1:7.

(3) 3-chloro-2-hydroxypropyl trimethyl ammonium chloride and a cellulose unit in the cellulose solution, in a molar ratio of 40:1, were dropwise added into the cellulose solution at a rate of 60 drops/minute, the mixture was stirred and mixed at 45° C. for 12 hours, the obtained quaternized cellulose solution was added into a reaction kettle, and then added with chloromethylated polystyrene with a particle size of 0.63 mm to 1.25 mm to react at 120° C. for 15 hours, and the obtained product was soaked with deionized water for 8 hours, repeatedly washed with deionized water to be neutral, and then dried to obtain a quaternized cellulose-based resin.

A mass ratio of the chloromethylated polystyrene to the quaternized cellulose was 5:1.

Embodiment 4

The preparation method in this embodiment was the same as that in Embodiment 1, and the only difference was that the temperature of the pre-cooling was −50° C. and the thermal insulation lasted for 1 hour.

Embodiment 5

The preparation method in this embodiment was the same as that in Embodiment 1, and the only difference was that the temperature of the pre-cooling was −10° C. and the thermal insulation lasted for 5 hours.

Embodiment 6

The preparation method in this embodiment was the same as that in Embodiment 1, and the only difference was that the chloromethylated polystyrene was added to react at 100° C. for 15 hours.

Embodiment 7

The preparation method in this embodiment was the same as that in Embodiment 1, and the only difference was that the chloromethylated polystyrene was added to react at 150° C. for 10 hours.

Comparative Example 1

(1) Preparation of cellulose solution: the same as that in Embodiment 1.

(2) The cellulose solution was added with sodium hydroxide, urea and distilled water, and stirred to dissolve, and the obtained aqueous solution was pre-cooled in a refrigerator to −20° C. and stored for 3 hours, and then immediately stirred vigorously at 25° C. at 600 rpm for 15 minutes to obtain a cellulose solution.

A mass ratio of cellulose to the urea in the cellulose solution was 1:55; a mass ratio of the cellulose to the sodium hydroxide in the cellulose solution was 1:37; and a mass ratio of the urea to the distilled water was 1:7.

(3) 3-chloro-2-hydroxypropyl trimethyl ammonium chloride and a cellulose unit in the cellulose solution, in a molar ratio of 5:1, were stirred and mixed at 25° C. for 16 hours, the obtained quaternized cellulose solution was added into a reaction kettle, and then added with chloromethylated polystyrene with a particle size of 0.63 mm to 1.25 mm to react at 120° C. for 12 hours, and the obtained product was soaked with deionized water for 5 hours, repeatedly washed with deionized water to be neutral, and then dried to obtain a quaternized cellulose-based resin.

A mass ratio of the chloromethylated polystyrene to the quaternized cellulose was 5:1.

Comparative Example 2

(1) Preparation of cellulose solution: the same as that in Embodiment 1.

(2) The cellulose solution was added with sodium hydroxide, urea and distilled water, and stirred to dissolve, and the obtained aqueous solution was pre-cooled in a refrigerator to −20° C. and stored for 3 hours, and then immediately stirred vigorously at 25° C. at 600 rpm for 15 minutes to obtain a cellulose solution.

A mass ratio of cellulose to the urea in the cellulose solution was 1:55; a mass ratio of the cellulose to the sodium hydroxide in the cellulose solution was 1:37; and a mass ratio of the urea to the distilled water was 1:7.

(3) 3-chloro-2-hydroxypropyl trimethyl ammonium chloride and a cellulose unit in the cellulose solution, in a molar ratio of 10:1, were stirred and mixed at 25° C. for 16 hours, the obtained quaternized cellulose solution was added into a reaction kettle, and then added with chloromethylated polystyrene with a particle size of 0.63 mm to 1.25 mm to react at 120° C. for 12 hours, and the obtained product was soaked with deionized water for 5 hours, repeatedly washed with deionized water to be neutral, and then dried to obtain a quaternized cellulose-based resin.

A mass ratio of the chloromethylated polystyrene to the quaternized cellulose was 5:1.

Comparative Example 3

(1) Preparation of cellulose solution: the same as that in Embodiment 1.

(2) The cellulose solution was added with sodium hydroxide, urea and distilled water, and stirred to dissolve, and the obtained aqueous solution was pre-cooled in a refrigerator to −20° C. and stored for 3 hours, and then immediately stirred vigorously at 25° C. at 600 rpm for 15 minutes to obtain a cellulose solution.

A mass ratio of cellulose to the urea in the cellulose solution was 1:55; a mass ratio of the cellulose to the sodium hydroxide in the cellulose solution was 1:37; and a mass ratio of the urea to the distilled water was 1:7.

(3) 3-chloro-2-hydroxypropyl trimethyl ammonium chloride and a cellulose unit in the cellulose solution, in a molar ratio of 20:1, were stirred and mixed at 25° C. for 16 hours, the obtained quaternized cellulose solution was added into a reaction kettle, and then added with chloromethylated polystyrene with a particle size of 0.63 mm to 1.25 mm to react at 120° C. for 12 hours, and the obtained product was soaked with deionized water for 5 hours, repeatedly washed with deionized water to be neutral, and then dried to obtain a quaternized cellulose-based resin.

A mass ratio of the chloromethylated polystyrene to the quaternized cellulose was 5:1.

Comparative Example 4

A 3-chloro-2-hydroxypropyl trimethyl ammonium chloride aqueous solution with the same concentration as that in Embodiment 1 was prepared, the 3-chloro-2-hydroxypropyl trimethyl ammonium chloride aqueous solution and chloromethylated polystyrene with a particle size of 0.63 mm to 1.25 mm were added into a reaction kettle to react at 120° C. for 12 hours, and the obtained product was soaked with deionized water for 5 hours, repeatedly washed with deionized water to be neutral, and then dried to obtain a quaternized resin.

A molar ratio of the chloromethylated polystyrene to the 3-chloro-2 hydroxypropyl trimethyl ammonium chloride in the 3-chloro-2-hydroxypropyl trimethyl ammonium chloride aqueous solution was 15:1.

Figure 1B:
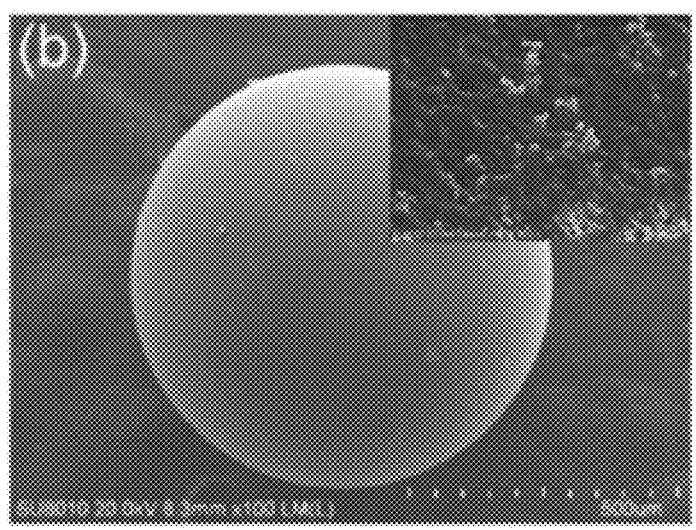

The quaternized cellulose-based resin prepared in Embodiment 1 of the present invention was detected by using a scanning electron microscope, and results were as shown in FIG. 1($a$) and FIG. 1($b$). It could be seen from FIG. 1($a$) and FIG. 1($b$) that a surface of original chloromethylated polystyrene was relatively smooth, a surface of the quaternized cellulose-based resin was rough, and particles grafted on the surface of the chloromethylated polystyrene were obviously observed, indicating that the quaternized cellulose had been successfully grafted on the surface of the chloromethylated polystyrene.

Figure 2:
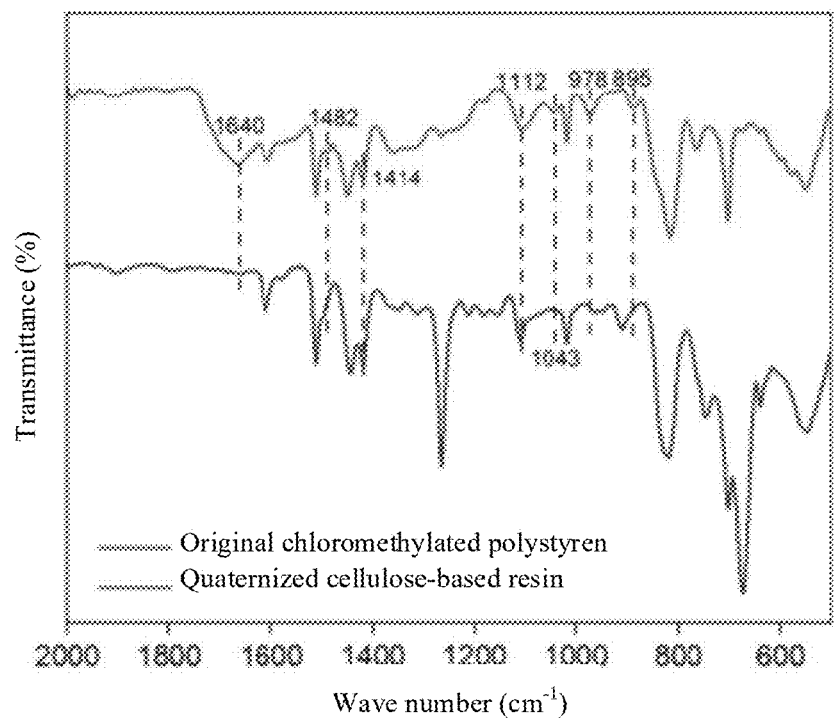
FIG. 2 is an infrared spectrogram of the original chloromethylated polystyrene and the quaternized cellulose-based resin in Embodiment 1 of the present invention.

The quaternized cellulose-based resin prepared in Embodiment 1 of the present invention was detected by using infrared spectroscopy, and results were as shown in FIG. 2. It could be seen from FIG. 2 that the quaternized cellulose-based resin had a new peak at 1482 cm$^{-1}$, which might be attributed to trimethyl of quaternary ammonium; and had a peak at 1640 cm$^{-1}$, which might be attributed to vibration of a quaternary nitrogen bond or bound water. In addition, a peak at 1414 cm$^{-1}$ was called C-N tensile vibration. Compared with an optical spectrum of the original chloromethylated polystyrene, an optical spectrum of the quaternized cellulose-based resin showed increases at 1112 cm- and 1043 cm$^{-1}$, which provided evidence of etherification, indicating that a quaternary ammonium group had been successfully incorporated into a cellulose backbone.

Figure 3:
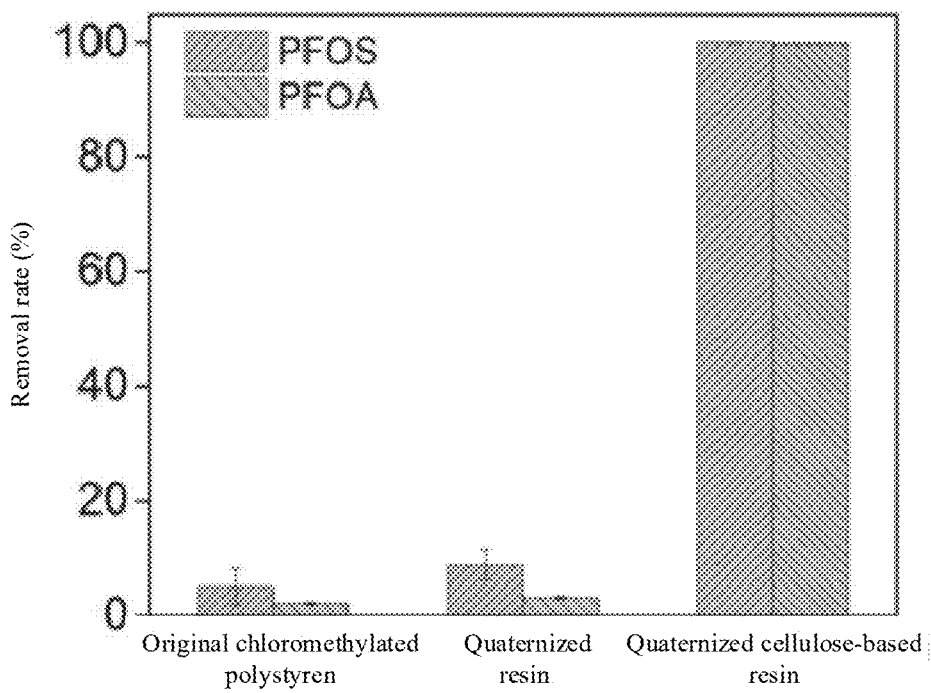
FIG. 3 is an effect diagram of PFAS removal of the original chloromethylated polystyrene and the quaternized cellulose-based resin in Embodiment 1 of the present invention and a quaternized resin prepared in Comparative Example 4.

A PFAS removal test was carried out on the original chloromethylated polystyrene and the quaternized cellulose-based resin in Embodiment 1 of the present invention and the quaternized resin prepared in Comparative Example 4, test conditions were as follows: a PFAS concentration was 10 μg/L, an adsorbent concentration was 0.5 g/L, a rotating speed was 180 rpm, and a temperature was 25° C., and results were as shown in FIG. 3. It could be seen from FIG. 3 that the original chloromethylated polystyrene could not effectively remove the PFAS, and the quaternized resin prepared in Comparative Example 4 could not well remove the PFAS either, while the quaternized cellulose-based resin provided by the present invention could well remove the PFAS, thus reaching the latest Drinking Water Standards (GB5749-2022) in China, and verifying the effectiveness of the preparation method provided by the present invention.

Figure 4:
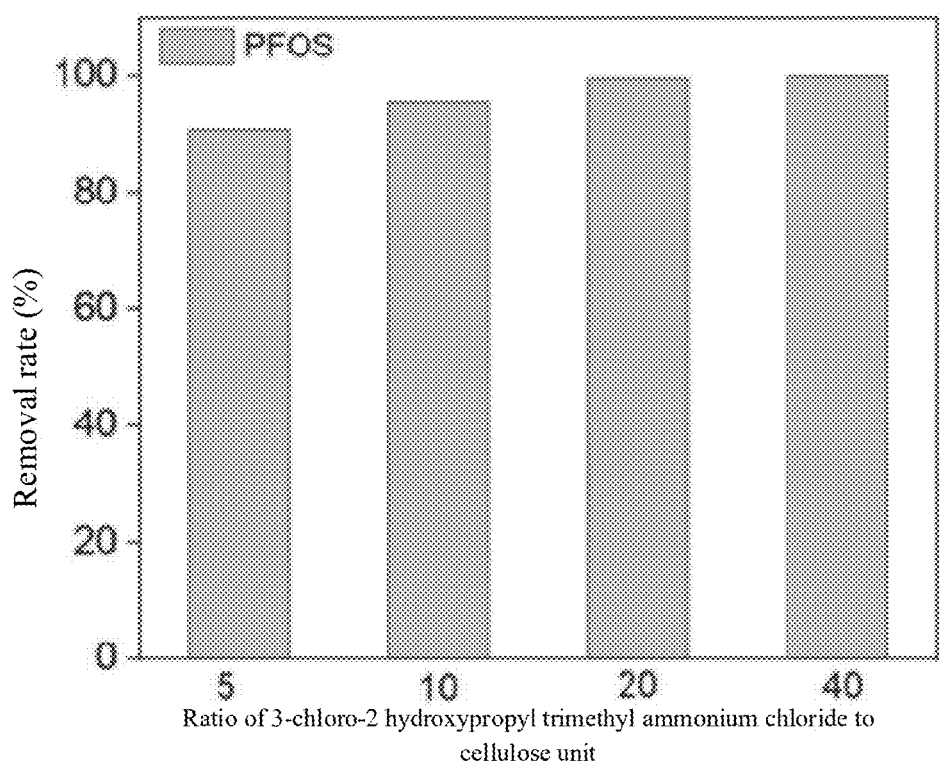
FIG. 4 is an effect diagram of PFAS removal of quaternized cellulose-based resins obtained by using different proportions of quaternary ammonium salts and cellulose units in Comparative Examples 1 to 3.

The PFAS removal test was carried out on the quaternized cellulose-based resins prepared in Comparative Examples 1 to 3 of the present invention, and results were as shown in FIG. 4. It could be seen from FIG. 4 that, with an increase of the ratio of the quaternary ammonium salt to the cellulose unit, the PFAS removal effect was improved, and the best and most stable removal effect was achieved when the molar ratio of the quaternary ammonium salt to the cellulose unit was 40.

Figure 5A:
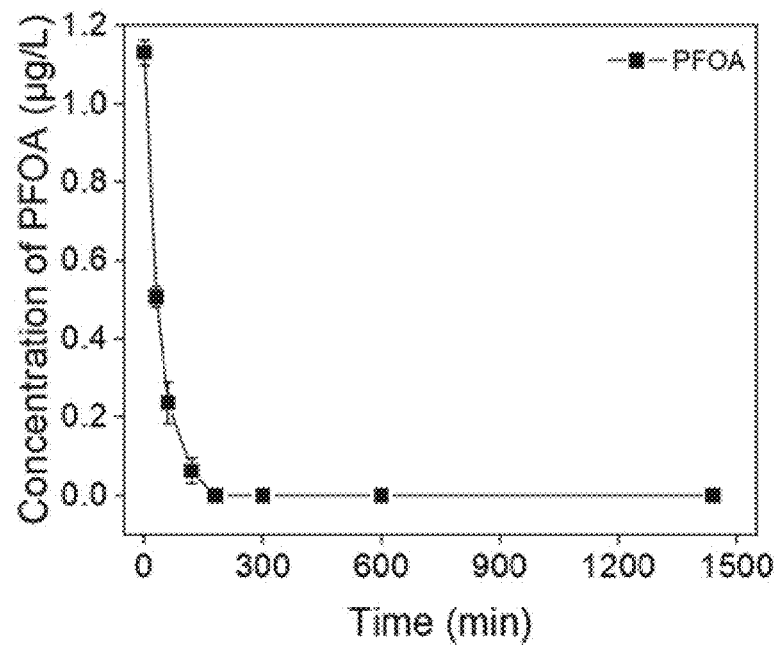
FIG. 5(a) and FIG. 5(b) are kinetic diagrams of removal of perfluorooctanoic acid (a) and perfluorooctane sulfonic acid (b) by the quaternized cellulose-based resin prepared in Embodiment 1 of the present invention.
Figure 5B:
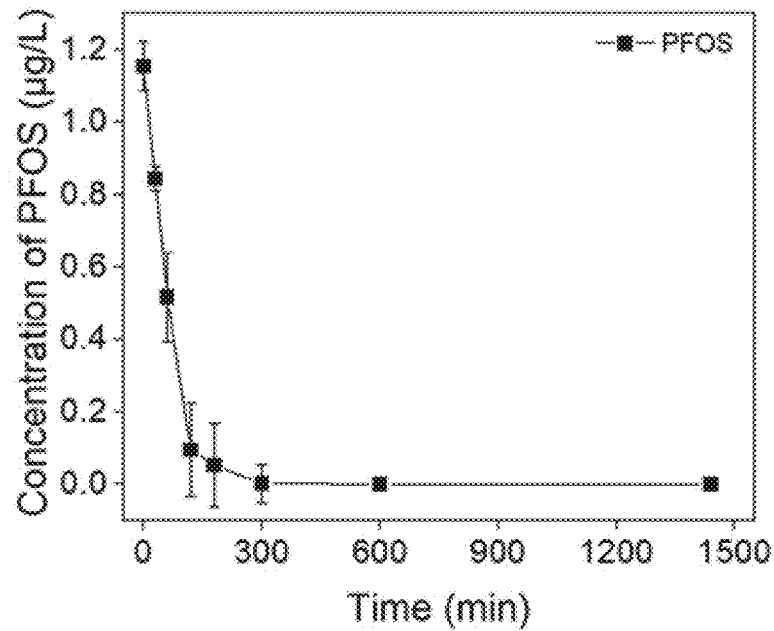

A kinetic test of removal of perfluorooctanoic acid (a) and perfluorooctane sulfonic acid (b) was carried out on the quaternized cellulose-based resin prepared in Embodiment 1 of the present invention, test conditions were as follows: a PFAS concentration was 1 μg/L, an adsorbent concentration was 1 g/L, and the adsorption lasted for 24 hours, and results were as shown in FIG. 5($a$) and FIG. 5($b$). It could be seen from FIG. 5($a$) and FIG. 5($b$) that, in the case of environment-related low-concentration PFOA/PFOS, an adsorption speed of the quaternized cellulose-based resin for the PFOA was faster than that for the PFOS, the PFOA reached a balance in about 2 hours, and the PFOS reached a balance in about 5 hours, which might be related to the fact that the PFOS had one fluorocarbon chain more than the PFOA molecule, and the PFOS was more hydrophobic than the PFOA. However, the quaternized cellulose-based resin mainly removed the PFAS through an electrostatic interaction, so that the adsorption speed for the PFOA was faster than that for the PFOS, which was also related to a pore structure of materials and a specific surface area.

It can be seen from the above embodiments that the quaternized cellulose-based resin provided by the present invention can effectively remove trace PFAS in water, is easy to recover, solves the problem that a traditional powder adsorbent is difficult to recover and use on a large scale, and has broad application prospects.

Although the above embodiments describe the present invention in detail, the embodiments are only some but not all of the embodiments of the present invention, and other embodiments can also be obtained according to the embodiments without inventiveness, all of which belong to the scope of protection of the present invention.

We claim:

1. A preparation method of a quaternized cellulose-based resin, comprising the following steps:
    (1) mixing a cellulose solution, sodium hydroxide, urea and water to obtain a mixture, and then sequentially subjecting the mixture to pre-cooling and high-speed mixing to obtain a cellulose solution, wherein a rotating speed of the high-speed mixing is 500 rpm to 1000 rpm, the high-speed mixing is ultrasonic mixing, power of the ultrasonic mixing is 1000 W to 1200 W, and the ultrasonic mixing lasts for 10 minutes to 30 minutes;
    wherein a temperature of the high-speed mixing is 25° C. to 45° C., and the high-speed mixing lasts for 5 minutes to 30 minutes;
    the cellulose solution comprises cellulose and water;
    a mass ratio of cellulose to the urea in the cellulose solution is 1:25 to 100;
    a mass ratio of the cellulose to the sodium hydroxide in the cellulose solution is 1:25 to 100,
    a mass ratio of the urea to the water is 1:2 to 11;

a temperature of the pre-cooling is −10° C. to −50° C., and the pre-cooling lasts for 1 hour to 5 hours; and a device for the pre-cooling is a refrigerator;

(2) dropping a 3-chloro-2-hydroxypropyl trimethyl ammonium chloride aqueous solution into the cellulose solution, mixing for a quaternization reaction to obtain a quaternized cellulose solution, wherein a rate of the dropping is 30 drops/minute to 90 drops/minute; and a rate of the mixing is 300 rpm to 800 rpm, a temperature of the mixing is 25 to 35° C., and the mixing lasts for 12 to 16 hours;

a temperature of the quaternization reaction is 25° C. to 50° C.; and (3) mixing the quaternized cellulose solution with chloromethylated polystyrene for a high-temperature reaction, wherein a particle size of the chloromethylated polystyrene is 0.315 mm to 1.250 mm, and a temperature of the high-temperature reaction is 100° C. to 150° C., so as to obtain the quaternized cellulose-based resin;

wherein the high-temperature reaction lasts for 10 to 15 hours, a mass ratio of the chloromethylated polystyrene to the quaternized cellulose is 1 to 10:1.

2. The preparation method according to claim 1, wherein a molar ratio of 3-chloro-2 hydroxypropyl trimethyl ammonium chloride in the 3-chloro-2-hydroxypropyl trimethyl ammonium chloride aqueous solution to a cellulose unit in the cellulose solution is 5 to 50:1.

3. The preparation method according to claim 1, wherein a temperature of the quaternization reaction is 20° C. to 50° C., and thermal insulation lasts for 12 hours to 20 hours.

* * * * *